M. T. AND M. C. CHAPMAN.
PUMPING MACHINERY.
APPLICATION FILED MAY 25, 1916.
1,307,116.
Patented June 17, 1919.
5 SHEETS—SHEET 2.
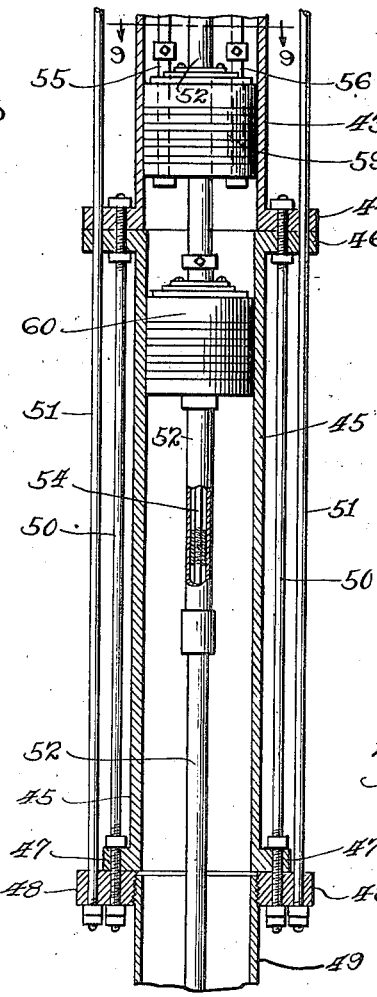
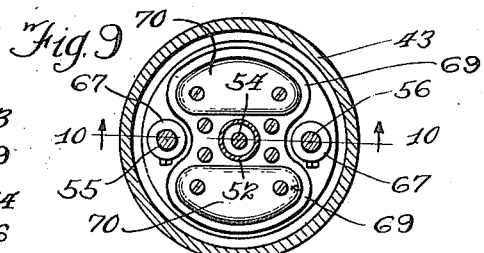
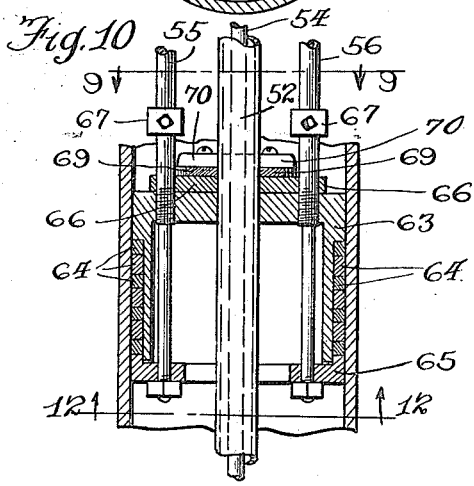
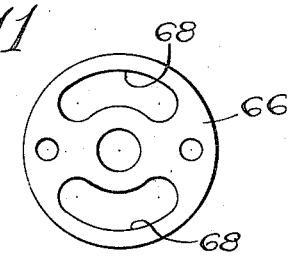
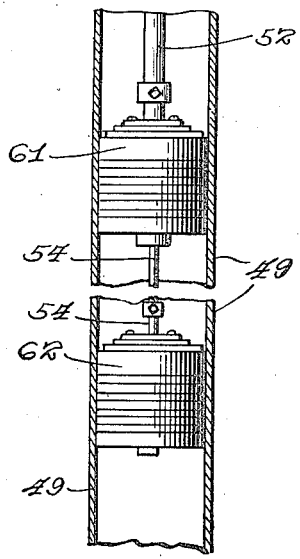
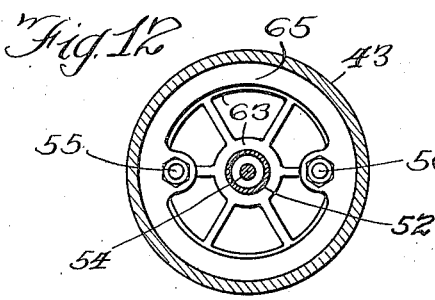
Inventors
Matthew T. Chapman
Mark C. Chapman
By Adams & Jackson
Attys.

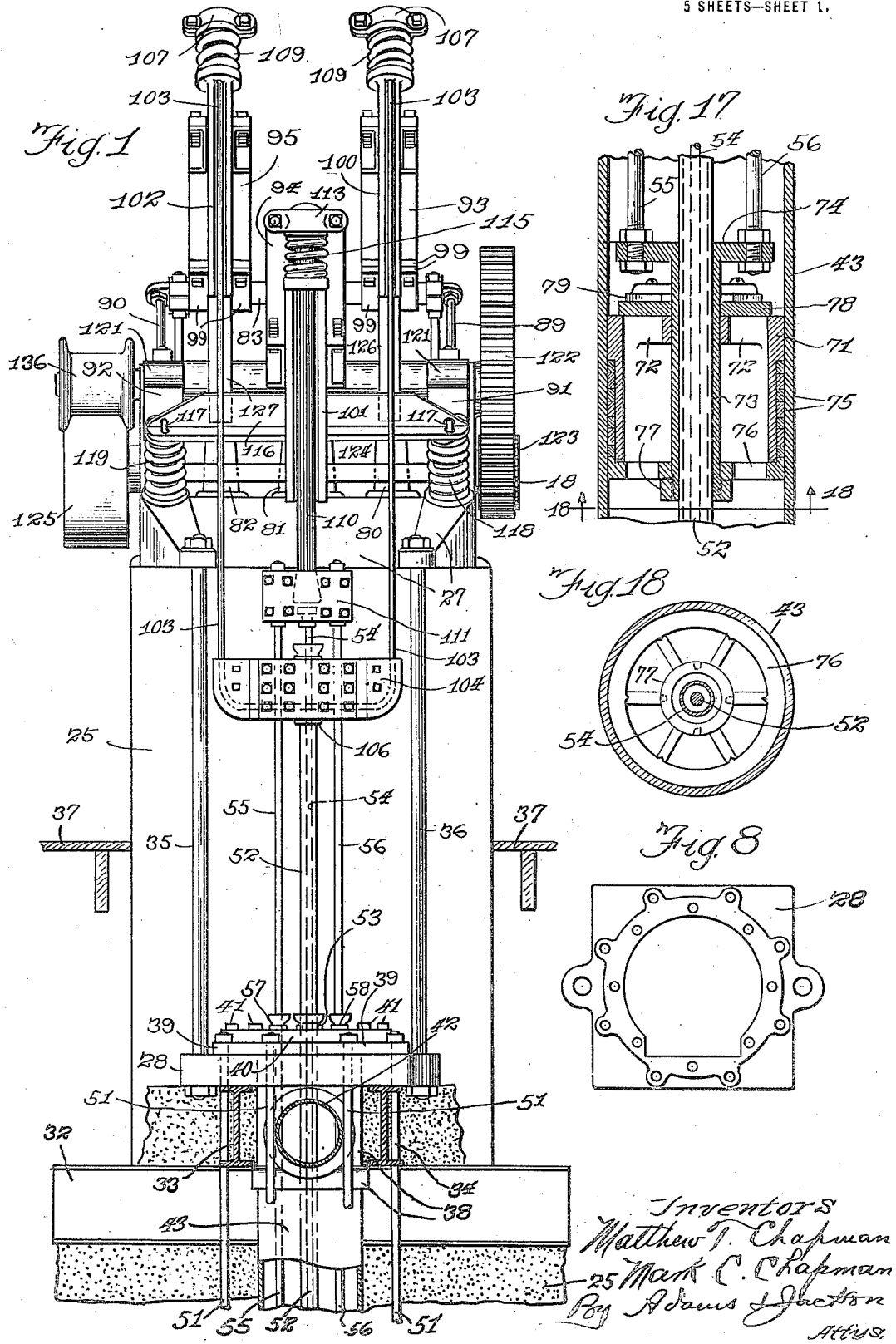

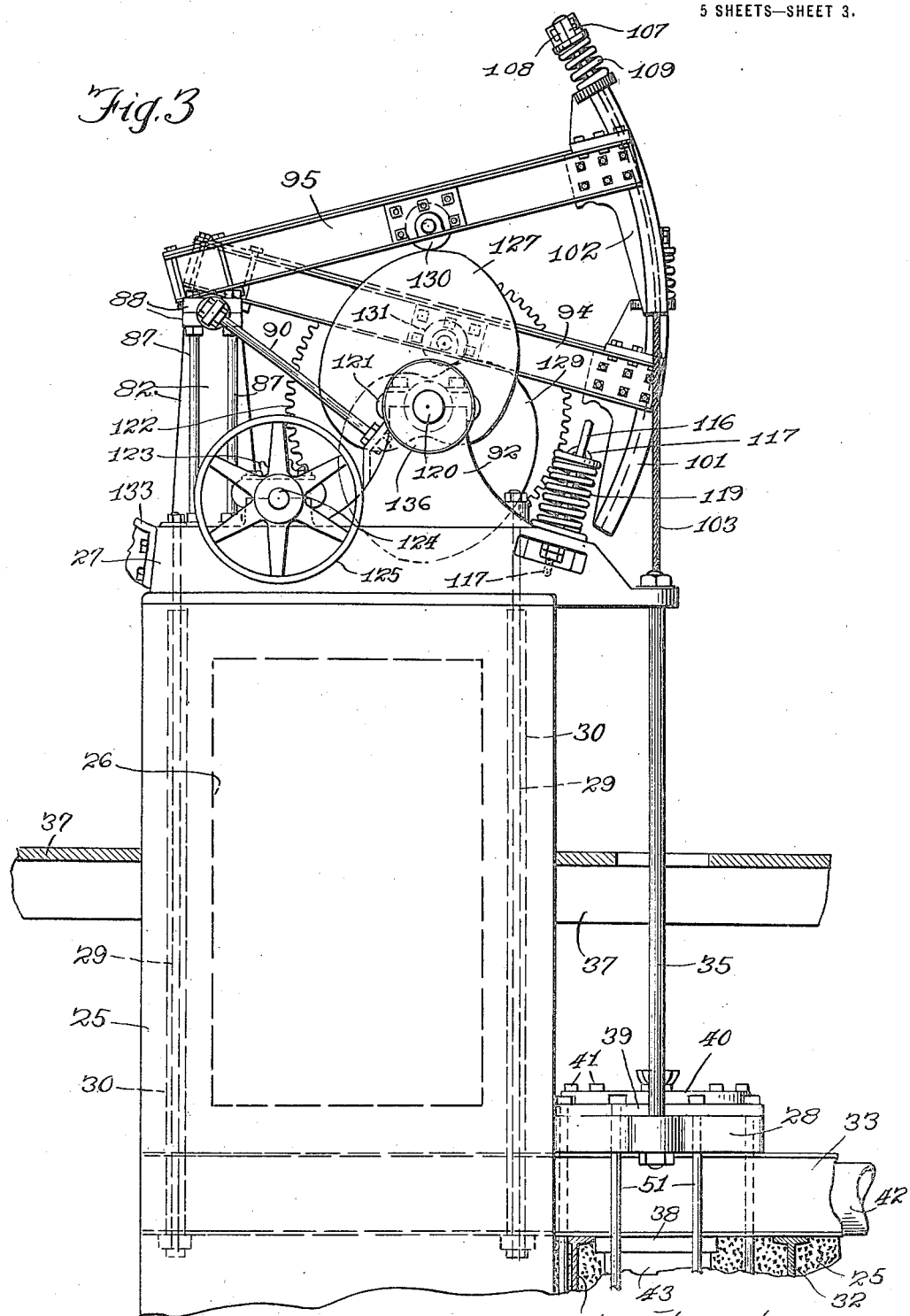

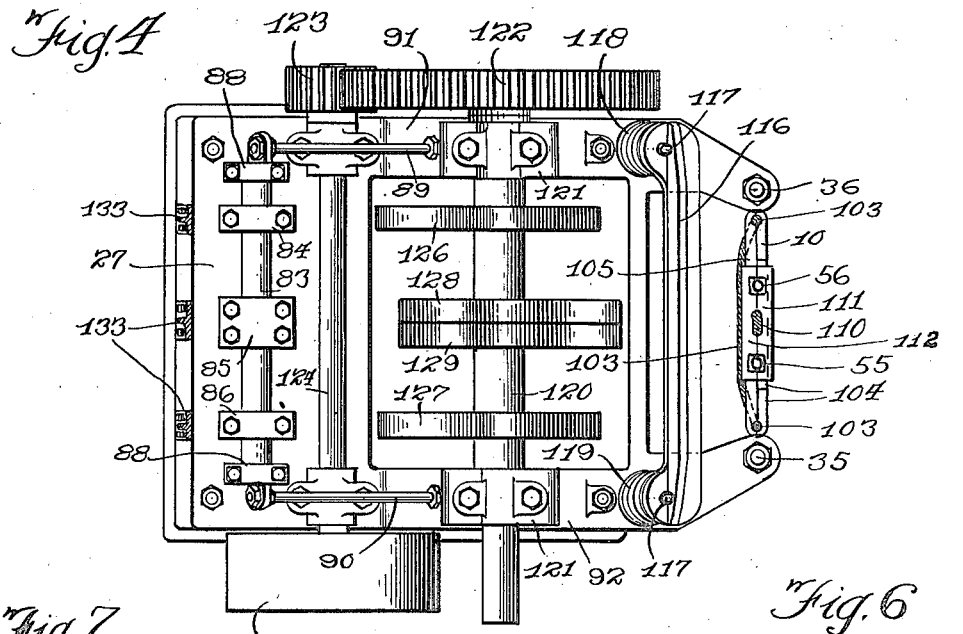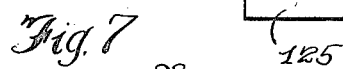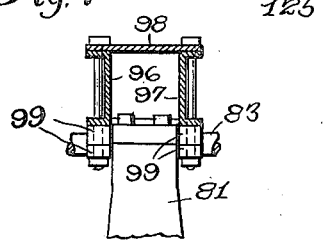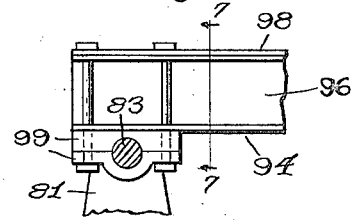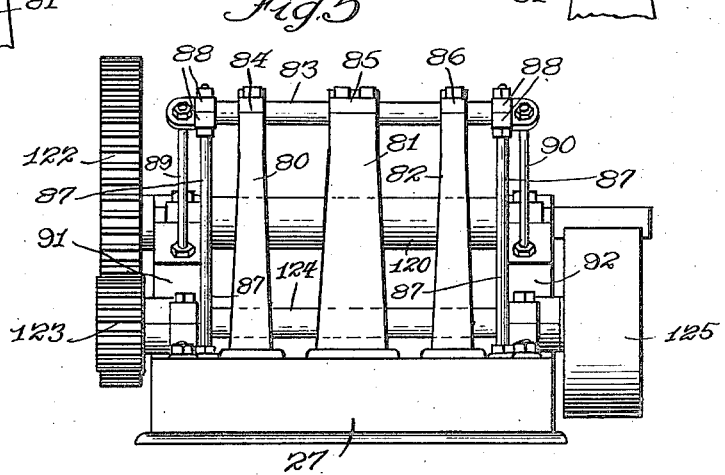

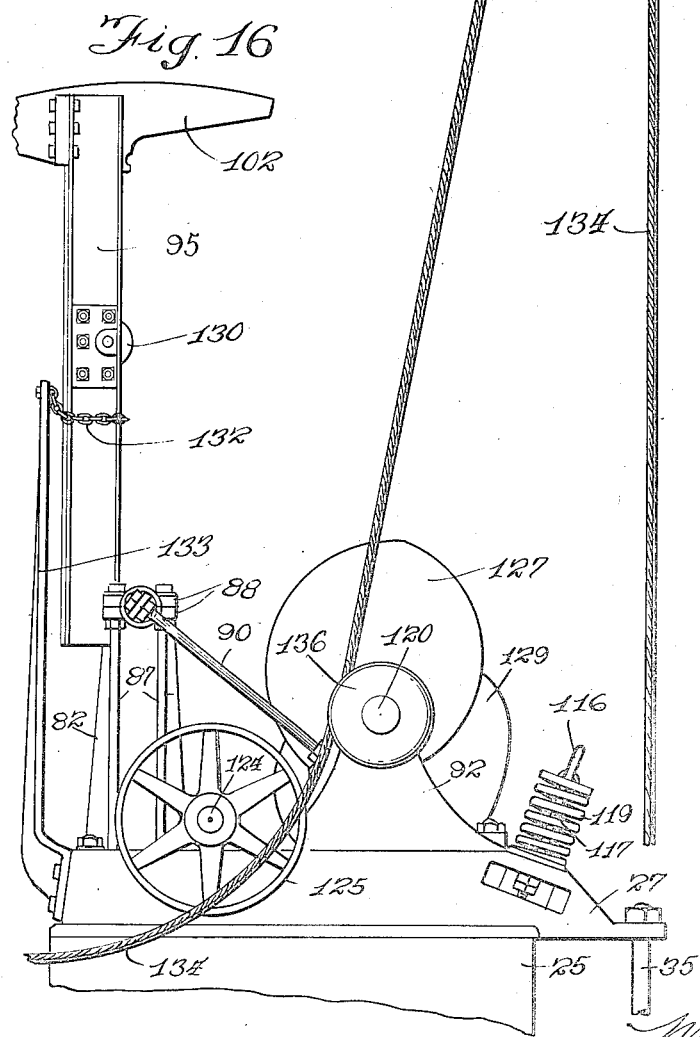

UNITED STATES PATENT OFFICE.

MATTHEW T. CHAPMAN AND MARK C. CHAPMAN, OF AURORA, ILLINOIS, ASSIGNORS TO THE AMERICAN WELL WORKS, OF AURORA, ILLINOIS, A CORPORATION OF ILLINOIS.

PUMPING MACHINERY.

1,307,116.   Specification of Letters Patent.   Patented June 17, 1919.

Application filed May 25, 1916. Serial No. 99,730.

*To all whom it may concern:*

Be it known that we, MATTHEW T. CHAPMAN and MARK C. CHAPMAN, citizens of the United States, and residents of Aurora, in the county of Kane, State of Illinois, have invented certain new and useful Improvements in Pumping Machinery, of which the following is a specification, reference being had to the accompanying drawings.

Our invention relates to pumping machinery of a type adapted for use in a water works system in which, if desired, the water may be pumped directly into the mains for immediate distribution. Preferably the water is lifted substantially to the surface of the ground by a set of coöperating plungers or pistons down in the well, a set of coöperating plungers or pistons being provided near the surface for taking the water from the lower plungers and lifting it the required additional distance, making it possible thus to use plunger-rods of a minimum size and strength reaching to the plungers down in the well, a maximum proportion of the work being performed by the upper plungers. In this way, the plunger rods are capable of adapting themselves as readily as possible to any irregularities in the well as it may vary slightly from a precise straight vertical alinement. Our plungers are preferably arranged in the manner disclosed in the patent of the applicant, Matthew T. Chapman, granted March 7, 1916, No. 1,174,121, in which the intermediate two plungers are operated in unison and the uppermost and lowermost plungers are operated in unison. The means for operating the plungers is arranged so as to cause each of the plungers successively of each set of coöperating plungers to start on its upward movement and to attain substantially a full-speed upward movement while another one of the same set of plungers is still moving upward at substantially full-speed near the end of its upward stroke.

It is one of the objects of our invention to provide a construction and arrangement of parts whereby the results as above set forth shall be attained to the best advantage, by the use of a minimum amount of power, and with a minimum of wear upon the machinery. It is another object of our invention to provide means for cushioning the plungers relative to the operating means at the start of their upward strokes. It is another object of our invention to provide means for cushioning the operating means at the end of the downward stroke, this being accomplished in the construction adopted by us by means of springs which are compressed at the end of the downward stroke of a plunger, serving thus to assist in starting the operating lever upward again for the next-succeeding operative stroke. It is another object of our invention to provide a new and improved form of foundation and framework for supporting the working parts for best results in the operation of the machine. It is another object of our invention to provide a new and improved form of valve in connection with the plungers or pistons, involving a lightly-opening passageway adapted to be opened first at the start of the downward stroke of the plunger, and another passageway which opens when the stream through the plunger assumes greater magnitude. It is another object of our invention to improve pumping machinery of this type in sundry details hereinafter pointed out.

The preferred means by which we have accomplished our several objects are illustrated in the accompanying drawings and are hereinafter specifically described. That which we believe to be new and desire to cover by this application is set forth in the claims.

In the drawings:

Figure 1 is a front view, partly in section, showing the upper part of a pumping means embodying our improvements;

Fig. 2 is a vertical sectional view being a continuation downward of the parts shown in Fig. 1;

Fig. 3 is a side view of the parts shown in Fig. 1;

Fig. 4 is a top view of the parts shown in Fig. 3 with the operating levers removed;

Fig. 5 is a rear view of the parts shown in Fig. 4;

Fig. 6 is an enlarged detail, being a fragmentary view showing the manner of mounting the operating levers;

Fig. 7 is a vertical cross-section taken on line 7—7 of Fig. 6;

Fig. 8 is a top view of the foundation plate which supports the upper cylinders and the well tube suspended therefrom;

Fig. 9 is a horizontal cross-section taken on line 9—9 of Fig. 10, being an enlarged horizontal cross-section on line 9—9 of Fig. 2;

Fig. 10 is a vertical cross-section through the plunger shown in Fig. 9, being taken substantially on line 10—10 of Fig. 9;

Fig. 11 is a top view of the valve plate shown in Fig. 10;

Fig. 12 is a horizontal cross-section taken on line 12—12 of Fig. 10;

Fig. 13 is an enlarged detail, partly in section, showing the manner of connecting the operating cable to the intermediate operating lever;

Fig. 14 is a cross-section through the head of the operating lever taken on line 14—14 of Fig. 13;

Fig. 15 is an enlarged detail, being a vertical cross-section showing the manner of mounting the buffer-plate with which the operating levers are brought into contact at the end of their downward strokes;

Fig. 16 is a side view showing the manner of operating for the removal of the plungers from the well;

Fig. 17 is a vertical cross-section through a modified form of plunger; and

Fig. 18 is a horizontal cross-section taken on line 18—18 of Fig. 17.

Referring to Figs. 1 to 16 in which corresponding parts are indicated by the same reference characters,—25 indicates a foundation of concrete or other suitable material, being provided with a hollowed-out space 26 at its center, as best shown in Fig. 3. The foundation 25 serves as a support for a bed-plate 27 for the operating mechanism, and a foundation-plate 28 for supporting the pump cylinders and the well tube. The bed-plate 27 is secured in position upon the foundation 25 by means of a plurality of heavy bolts 29 passing down through tubes 30 embedded in the foundation, the tubes 30 being of a slightly larger interior diameter than the diameter of the bolts whereby the bed-plate 27 can be properly adjusted. The foundation 25 is provided with transversely-extending I-beams 31—32 and I-beams 33—34 extending at right angles to the beams 31—32, the I-beams being embedded in the foundation 25. The foundation-plate 28 rests directly upon the I-beams 33—34. Heavy bolts 35—36 connect the forward end of the bed-plate 27 with the foundation plate 28 in front of the higher portion of the foundation 25. A platform 37 of any suitable type is provided about the foundation 25 at an intermediate point.

As is best shown in Fig. 8, the foundation-plate 28 is cut out at its forward edge whereby it is adapted to permit a T-head 38 to be lowered therethrough so as to bring the flange 39 formed integrally with the head into position upon the plate 28 as shown in Fig. 1. A plate 40 is secured in position upon the flange 39 by means of bolts 41 which pass through the plate and through the flange into the foundation-plate 28.

The T 38 has a discharge pipe 42 connected by any suitable means to its front face for the delivery of water raised by the pumping means. The lower end of the T-head 38 has the upper end of a cylinder 43 connected thereto, the connection being effected preferably by means of screw-threads. The lower end of the cylinder 43 is provided with a flange 44 by means of which a second cylinder 45 is connected thereto through the medium of a flange 46. The lower end of the cylinder 45 is provided with a flange 47 which is utilized for securing a collar 48 to the lower end of the cylinder, the collar 48 being connected by means of screw-threads to the upper end of a line of well-pipe 49. A plurality of long bolts 50 pass through the flanges 44, 46 and 47 and through the collar 48 for connecting the several parts together as shown in Fig. 2. A plurality of bolts 51 extend from the flange 39 of the T downward through suitable openings in the foundation-plate 28, through the flanges 44 and 46 and through the collar 48 for additionally supporting the collar 48 from the foundation-plate 28.

As best shown in Fig. 1, a hollow plunger-rod 52 extends downward through an oil stuffing-box 53 carried by the plate 40. Another plunger-rod 54 extends down inside of the hollow rod 52. A pair of plunger-rods 55—56 extend downward through oil stuffing-boxes 57—58, respectively, carried by the plate 40 at opposite sides of the stuffing-box 53. As is shown in Fig. 2 the plunger-rods 55—56 are connected at their lower ends with a plunger 59 adapted to be reciprocated within the cylinder 43. The plunger-rod 52 has fixed upon it a plunger 60 adapted to be reciprocated within the cylinder 45. As is shown in Fig. 2, the plunger-rods 52 and 54 are adapted to be made in sections connected together by suitable couplings. Fixedly mounted upon the lower end of the plunger-rod 52, preferably well below the level of the water in the well, is mounted a plunger 61 adapted to be reciprocated along the well tubing 49. Fixedly mounted upon the lower end of the plunger-rod 54 below the plunger 61 is another plunger 62 adapted also to be reciprocated in the well-tube 49.

Means are provided as hereinafter described for operating the plunger-rods 54, 55 and 56 in unison whereby the plungers 59 and 62 are reciprocated together. Means are also provided, as hereinafter described, for reciprocating the plunger-rod 52 so as to cause the plungers 60 and 61 to coöperate with the adjacent plungers 59 and 62, respectively. The plungers 61—62 are designed to raise the water from the bottom of the well to a point within the influence of the plungers 59 and 60 which are adapted to take the water near the surface of the ground and to raise it to the required height, the capacity of the upper plungers being the same as that of the lower plungers. In order to have the capacity of the cylinder 43 substantially equal to that of the cylinder 45, the cylinder 43 is made of slightly greater diameter to compensate for the space occupied by the plunger-rods 55—56 within the cylinder 43. On account of the reduced amount of work performed by the plunger-rod 52 below the cylinder 45 in operating the plunger 61 as compared with the amount of work performed by the upper portion of the plunger-rod 52 in operating plungers 60 and 61, the plunger-rod 52 is reduced in size below the plunger 60.

As best shown in Figs. 9 to 12, the plunger 59 comprises a cylinder 63 having suitable packing-rings 64 mounted thereon, the packing rings 64 being held in position by a collar 65 secured in position by means of nuts upon the lower ends of plunger-rods 55—56 which are connected by means of screw-threads to the cylinder 63. The upper end of the cylinder 63 is made in the form of a spider, as is best shown in Fig. 12, whereby water is free to pass upward through the cylinder. A valve-plate 66 is seated upon the spider portion of the cylinder 63 having a sliding mounting upon the plunger-rods 55—56, being limited in its upward movement by collars 67 secured upon the plunger rods. As is shown in Fig. 11, the valve-plate 66 is provided with openings 68 at opposite sides adapted to be closed by an auxiliary valve 69 in the form of a sheet of leather or other flexible material reinforced and stiffened by plates 70 suitably secured thereto. By reason of such construction, upon the start of the downward stroke of the plunger 59, the flexible valve 69 is first displaced upward opening the ports 68. When the volume of water passing through the plunger increases upon an increase in the rate of downward movement of the plunger, the plate 66 is lifted out of contact with the cylinder 63, permitting the requisite flow through the plunger. The plungers 60, 61 and 62 are designed to be of any approved type, preferably provided with valves of the type shown in connection with the plunger 59 as above described.

In Figs. 17 and 18 we have shown a modified form of plunger to be used if desired in lieu of the form of plunger shown in Figs. 9 to 12. In the construction shown in Figs. 17 and 18, a cylinder 71 is connected by means of radially-extending arms 72 with a sleeve 73 which is adapted to slide along the plunger-rod 52 and which is connected by means of a cross-head 74 with the lower ends of the plunger-rods 55—56. Packing-rings 75 are held in position about the cylinder 71 by means of a spider 76 which in turn is held in position by means of a nut 77 secured by means of screw-threads upon the lower end of the sleeve 73. A valve-plate 78 provided with an auxiliary valve 79 is limited in its vertical movement by engagement with the lower ends of the plunger-rods 55—56.

Referring again to Figs. 1 to 16 for a description of the means by which the plunger-rods are operated, 80—81—82 indicate standards rising from the bed-plate 27, as best shown in Fig. 5. A cylindrical cross-bar 83 is held in position in the upper ends of the standards 80—81—82 by means of suitable cap-plates 84—85—86, respectively, being further braced by means of bolts 87 which are secured to the bed-plate 27 at their lower ends and are secured at their upper ends to the cross-bar 83 by means of cupped bars 88. The cross-bar 83 is still further braced against movement forward and back relative to the bed-plate 27 by means of diagonally-extending bolts 89—90 connected by means of nuts at their upper ends to the ends of the cross-bar 83, and connected by means of nuts at their lower ends to convenient portions of standards 91—92 rising from the bed-plate 27 at its opposite sides.

The means for operating the plunger-rods comprises three levers 93—94—95 adapted to swing vertically about the cross-bar 83. Each of these three levers comprises two oppositely-disposed channel-irons 96—97 (see Fig. 7) connected together at their upper edges by means of a plate 98. The levers are pivotally mounted upon the cross-bar 83 by means of bearing-blocks 99, a pair of which are provided underneath each of the channel-irons of each lever, the engagement of the bearing-blocks 99 with the standards 80—81—82, as best shown in Fig. 7, serving to hold the levers in proper spaced position laterally.

The levers 93—94—95 are provided at their forward ends with curved heads 100—101—102, the curved portions of the heads being in the form of arcs about the axis of the levers upon the cross-bar 83. Means are provided, as hereinafter described, for swinging the levers 93 and 95 in unison.

The levers 93—95 are connected to the plunger-rod 52 by means of a cable 103, the ends of which are connected to the said levers and an intermediate portion of which is slidably connected by means of clamping plates 104—105 (see Figs. 1 and 4) with the said plunger-rod 52. The clamping-plates 104—105 are connected to the plunger-rod 52 by means of an oil stuffing-box 106 as shown in Fig. 1. As is shown in Fig. 4, the cable 103 is diverted out of a straight transverse path between the ends of the plates 104—105 so as to avoid contact with the stuffing-box 106 and with the plunger-rods 55—56 which have a sliding bearing between the plates. The ends of the cable 103 are connected with the levers 93—95 by means of clamping-plates 107—108 which are supported at the upper ends of the heads 100—102 by means of coiled springs 109. The arrangement is such that as the levers 93—95 are reciprocated up and down the vertically-extending portions of the cable 103 are kept constantly in proper alinement with the plunger-rod 52.

The intermediate lever 94 is connected to the plunger-rods 54, 55 and 56 by means of a flat cable 110 which is connected by means of clamping-plates 111—112 with the said plunger-rods. The upper end of the flat cable 110 is connected to the lever 94 by means of clamping-plates 113—114 which are supported by means of a spring 115 upon the head 101 of the said lever. As is shown at the lower end of the cable 110 in Fig. 1 and at the upper end of the cable 110 in Fig. 13, the connections between the ends of the several cables and the various clamping plates are effected by means of enlarged end portions of the cables provided thereon in any suitable manner.

Near the forward end of the bed-plate 27 there is provided a transversely-extending bar 116, preferably in the form of a T-iron as shown in Fig. 15. The ends of the bar 116 are connected by means of eye-bolts 117 with the bed-plate 27. Coiled springs 118—119 are mounted about the eye-bolts 117 for supporting the cross-bar 116 yieldingly in position relative to the bed-plate 27. The cross-bar 116 is located in such a position as to be engaged by the levers 93—94—95 at the end of their downward stroke so as to serve as cushioning means for said levers.

Revolubly mounted in the upper ends of the standards 91—92 is a heavy transversely-extending shaft 120 which is held in position in said standards by means of cap-plates 121. The shaft 120 is adapted to be driven through the medium of a gear 122 fixed upon one end of the shaft and meshing with a pinion 123 fixed upon the end of a shaft 124 revolubly mounted upon the bed-plate 27 and provided at its opposite end with a pulley 125 or other convenient driving means.

As best shown in Fig. 4, the shaft 120 is provided with cams 126 and 127 in alinement with the levers 93—95, respectively, and with cams 128—129 in alinement with the intermediate lever 94. Each of the levers 93—95 is provided with an anti-friction roller 130 of any suitable type adapted to coöperate with the cams 126—127 for reciprocating the said levers 93—95. The intermediate lever 94 is provided with two anti-friction rollers 131 of any suitable type adapted to coöperate with the cams 128—129 for reciprocating the lever 94. The shape of the cams is such that upon the rotation of the shaft 120 in counterclockwise direction in Fig. 3, the levers are caused to move upward during a greater portion of the period of each complete rotation of the shaft than that required for the down stroke of the levers. The cams 126 and 127 are so positioned upon the shaft 120 relative to the cams 128—129 that the levers 93 and 95 are brought to their uppermost position precisely at the end of a half rotation of the shaft 120 following the moment when the lever 94 reaches its uppermost position. It therefore follows that the plungers 60—61 start downward from their uppermost position as controlled by the levers 93—95 shortly after the plungers 59—62 have reacher their lowermost position and have started upward actuated by the lever 94. The plungers 61 and 60 then move downward until near the end of the upward movement of the plungers 59—62, at which time the plungers 60—61 are brought to rest and are started upward before the end of the upward movement of the plungers 59—62. After all four of the plungers have moved upward for a short time the plungers 59—62 reach their uppermost position and are started on their downward movement which continues until near the end of the upward stroke of the plungers 60—61. For a short time after the plungers 59—62 reach their lowermost position and start upward, all four of the plungers again move upward at the same time until the plungers 60—61 again reach their uppermost position.

The shape of the cams is preferably such that the levers 93—95 will be brought to substantially their full-speed movement on their upward stroke before the lever 94 reaches its uppermost position, and the lever 94 will in turn reach approximately its full-speed movement at the start of its upward stroke before the levers 93—95 reach their uppermost position. Preferably each of the levers after a gradual start upon its upward stroke is moved upward at a constant full-speed rate of movement so as to cause one or the other of each set of coöperating plungers to be moving upward at all times at such full-speed rate of movement.

By the use of the springs 109 and 115 for connecting the plunger-rods to the levers, provision is made for a positive movement of the levers without a corresponding positive movement of the plungers whereby the likelihood of objectionable water-hammer is materially decreased. By reason of the fact, however, that the column of water is being moved upward at a constant speed independently of the plunger which is being started upward to attain the same speed of upward movement, the change of direction of movement of the plunger is effected with comparative ease. By reason of the use of the transverse cushioning bar 116, the springs 118—119, when compressed at the end of the downward stroke of the lever, are adapted to assist in the initial upward movement of the lever, thus taking a portion of the strain off of the cams and other operating parts. By the use of the lightly-opening valves 69 in the several plungers, the plungers are adapted to start downward much more readily and to attain their full-speed downward movement much more quickly than would be the case if such lightly-opening valves were not employed.

When it is desired to remove the plungers from the well, the plungers are to be disconnected from the levers 93—94—95, whereupon the levers can be turned up into the position shown in Fig. 16 and held in such upright position by means of hooked chains 132 carried at the upper ends of upright bars 133 secured to the bed-plate 27. The plunger-rods and plungers are then adapted to be withdrawn from the well by means of a cable 134 passing over a sheave 135 supported in elevated position in any suitable manner, the cable being actuated by engagement with the drum 136 fixed upon one end of the shaft 120.

In the construction illustrated, the plates 111 and 112 comprise in effect a cross-head rigidly connecting the plunger-rods 55—56 with the plunger-rod 54, while the clamping plates 104—105 comprise in effect a cross-head for the operation of the plunger-rod 52.

What we claim as our invention and desire to secure by Letters Patent, is—

1. In a pump, the combination of a plunger, a reciprocatory member, flexible connections between said reciprocatory member and said plunger, and means for moving said reciprocatory member up and down, said plunger being provided with an upwardly-opening valve adapted to provide for the major flow of water through the plunger and with a lightly-opening valve adapted to open in advance to provide for the initial flow through the plunger, whereby the plunger is adapted to readily assume a downward movement by gravity.

2. In a pump, the combination of a walking-beam, means for reciprocating said walking-beam up and down, a head on said walking-beam curved about the axis about which said walking-beam swings, a plunger in vertical alinement with the curved portion of said walking-beam, a spring mounted on the upper portion of said head, a cable wound about the curved portion of said head and connected with said spring and also with said plunger, and a yielding device adapted to be engaged by said walking-beam near the end of its downward stroke and to assist in starting the walking-beam upon its succeeding upward stroke.

3. In a pump, the combination of a walking-beam, means for reciprocating said walking-beam up and down, a head on said walking-beam curved about the axis about which said walking-beam swings, a plunger in vertical alinement with the curved portion of said walking-beam, a spring mounted on the upper portion of said head, and operative connections between said spring and said plunger, comprising a cable adapted to be wound about the curved portion of said head.

4. In a pump, the combination of two walking beams, means for reciprocating said walking-beams up and down in unison, a head on each of said walking-beams curved about the axis about which said walking-beams swing, springs mounted on the upper end portions of said heads respectively, a flexible cable having its ends connected with said springs whereby its end portions are adapted to be wound about the curved portions of said heads, a plunger, and connections between said plunger and said cable.

5. In a pump, the combination of a walking-beam, means for reciprocating said walking-beam up and down, a head on said walking-beam curved about the axis about which said walking-beam swings, a coiled spring mounted on the upper end portion of said head, a flexible cable extending upward through said coiled spring, clamping plates connected to the upper end of said cable and bearing on the upper end of said spring, a plunger, and connections between said plunger and said cable.

6. In a pump, the combination of a plurality of plungers, a plurality of walking-beams, connections between said walking-beams and said plungers respectively, means for swinging said walking-beams up and down, and a spring-seated bar adapted to be engaged by said walking-beams near the end of their downward strokes and adapted by being displaced against the action of said springs by the downward stroke of a walking-beam to assist in starting the walking-beam upon its succeeding upward stroke.

7. In a pump, the combination of a foundation comprising two table portions at different levels, a bed-plate on the higher table portion, a second plate on the lower table portion, bolts connecting said bed-plate with said second plate, means connecting said second plate with the well-tube, a plunger adapted to be reciprocated in said well, and means mounted upon said bed-plate for reciprocating said plunger.

8. In a pump, the combination of a concrete foundation comprising two table portions at different levels, the lower portion of which has embedded in it a plurality of I- beams extending in opposite directions, a bed-plate secured upon the higher table portion by means of bolts passing through and adjustable in vertical tubes embedded in said higher portion, a foundation-plate on the lower table portion, bolts connecting said bed-plate with said foundation-plate, means for connecting said foundation-plate with the well-tube, a plunger adapted to be reciprocated in said well-tube, and means mounted upon said bed-plate for reciprocating said plunger.

9. In a pump, the combination of a foundation-plate, a T-head supported by said foundation-plate, a cylinder connected with said T-head, a second cylinder secured below said first-named cylinder, a collar below said second cylinder, and a plurality of bolts passing through said foundation-plate, through a flange on said T-head, and through said collar for connecting said parts firmly together.

10. In a pump, the combination of a foundation-plate, a T-head supported by said foundation-plate, a cylinder connected with said T-head, said cylinder having an outwardly extending flange at its lower end, a second cylinder provided with an outwardly-extending flange at its upper end secured below said first-named cylinder, said second cylinder having an outwardly-extending flange at its lower end, a collar below said second cylinder, a plurality of bolts passing through the flanges formed on said cylinders and through said collar for connecting said parts firmly together, and a plurality of other bolts passing through said foundation-plate, through a flange on said T-head, through the flanges formed on said cylinders, and through said collar for connecting such parts firmly together.

11. In a pump, the combination of a bed-plate, a plurality of standards rising from said bed-plate, a cross-bar mounted on said standards, a plurality of vertically-extending bolts connected at their upper ends to said cross-bar and at their lower ends to said bed-plate for bracing said cross-bar against upward moveemnt relative to the bed-plate, a plurality of diagonally-extending bolts connected at their upper ends to said cross-bar and at their lower ends to said bed-plate in advance of said cross-bar for bracing the cross-bar against movement forward or backward relative to the bed-plate, a walking-beam revolubly mounted on said cross-bar, means for swinging said walking-beam about said cross-bar, and a plunger connected with said walking-beam and adapted to be reciprocated thereby.

MATTHEW T. CHAPMAN.
MARK C. CHAPMAN.